No. 631,498. Patented Aug. 22, 1899.
J. M. CLARK.
CORN CULTIVATOR.
(Application filed Mar. 15, 1899.)
(No Model.)

WITNESSES
Chas. K. Davies.
L. B. Meeutchen

INVENTOR
J. M. Clark
By H. T. Bartlett
Attorney

THE NORRIS PETERS CO., PHOTO-LITHO., WASHINGTON, D. C.

UNITED STATES PATENT OFFICE.

JAMES M. CLARK, OF CLARKSDALE, MISSOURI.

CORN-CULTIVATOR.

SPECIFICATION forming part of Letters Patent No. 631,498, dated August 22, 1899.

Application filed March 15, 1899. Serial No. 709,127. (No model.)

*To all whom it may concern:*

Be it known that I, JAMES M. CLARK, a citizen of the United States, residing at Clarksdale, in the county of De Kalb and State of Missouri, have invented certain new and useful Improvements in Corn-Cultivators, of which the following is a specification, reference being had therein to the accompanying drawings.

This invention relates to cultivators for cultivating listed corn.

The object of the invention is to produce a cultivator which may run in the trenches in which the corn-hills are planted and be able to cut down weeds or trash on the ridges and work and turn the soil of these ridges generally toward the growing corn, and the rotary cultivators are made adjustable to various positions to accomplish these objects.

The invention consists in various constructions and combinations, as hereinafter described and claimed.

Figure 1:
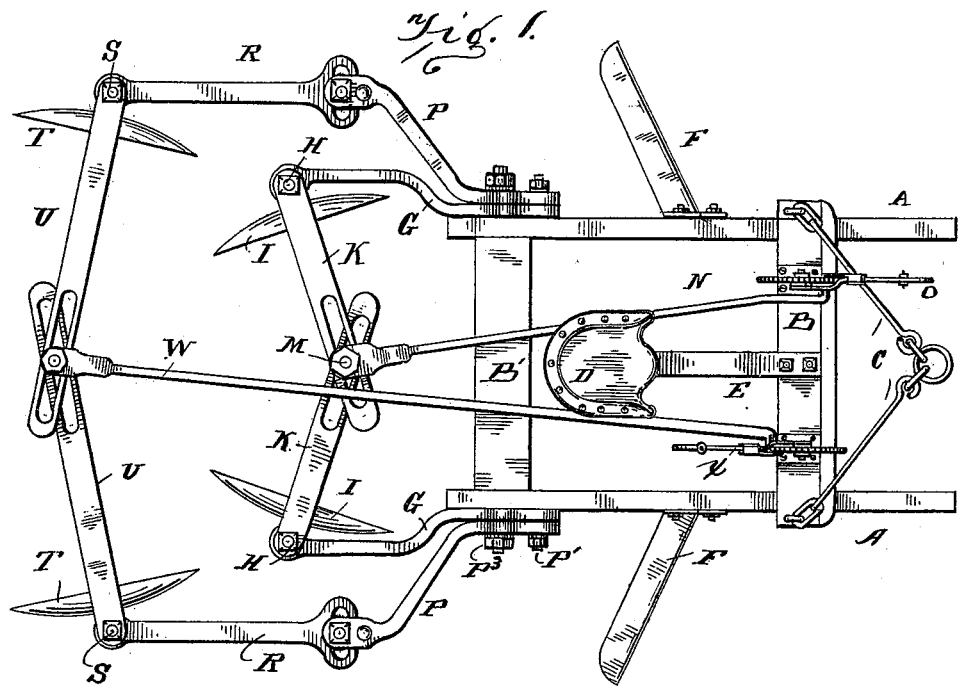
Figure 3:
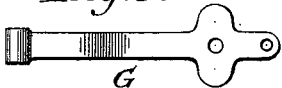
Figure 2:
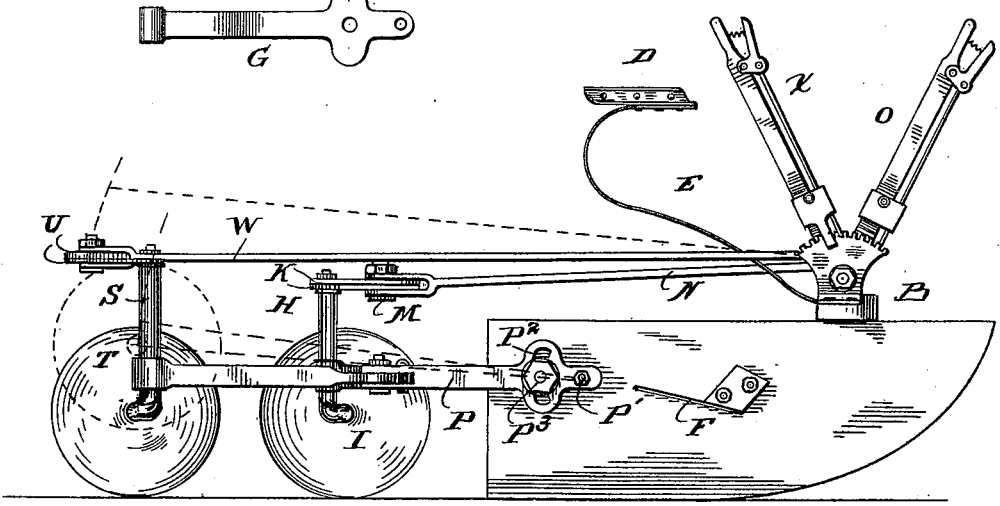

Figure 1 is a plan view of the cultivator. Fig. 2 is a side elevation omitting the draft attachment. Fig. 3 is a detail elevation of one of the arms G.

A A indicate a pair of light runners, of wood or metal, like sled-runners, which are firmly held by braces B B'. The runners are far enough apart to straddle corn-hills growing in the depressions or trenches in which corn is planted when it is termed "listed." The braces are placed high enough to pass over young corn without injury thereto. Any usual draw-rods, as C C, may be used. Seat D may be attached in any suitable way, as by a spring-bar E, attached to the front brace.

Blades F F extend from the runners A and are preferably inclined upward and backward. These blades usually cut into the soil of the ridges just under the surface, thus cutting off weeds just above the roots and loosening the soil at the same time.

Strong arms G G are attached to runners A and extend backward and preferably a little outward from the runners. These arms have at their ends bearings for short vertical shafts H. The lower ends of these shafts H are turned inward and form axles for the cultivator-disks I. The arms G are rigidly attached to the runners by bolts P' and P³ passing through holes in the arms. The arms G are widened opposite the holes through which bolts P³ pass, and thus form wear-plates against which arms P are clamped.

Shafts H have slotted arms K rigidly attached thereto, and the arms overlap each axle, so that a bolt M may extend through the slots of both arms. A draw-rod N extends forward from bolt M and connects to hand-lever O. Lever O may be held in adjusted position by usual locking mechanism.

It will readily be seen that the adjustment of lever O will swing the arms K by means of the rod and connections, and thus rock the shafts H and change the angle of the disks I relatively to the runners, causing the disks to turn over more or less earth, as is usual in disk harrows and cultivators.

Strong arms P are also attached to the runners outside the arms G, as by bolts P'. These arms have vertical or arc-shaped slots P², through which bolts P³ pass, said bolts being secured to the runners. The rear ends of arms P are thus adjustable vertically by means of this bolt-and-slot connection, (see dotted lines, Fig. 2,) and the disks carried by the extensions of said arms can be made to run deeper or shallower, as may be desired, according to the conditions of working.

Arms R are connected to the rear ends of arms P by pivot, transverse slot, and bolt connections, substantially like the connection at the front of arms P above described. By such connection, which is common in implements of this general character, the rear ends of arms R may be adjusted outward or inward relatively to the line of travel of runners A and disks I.

Short vertical shafts S have their bearings at the rear ends of arms R, and these shafts S have inturned ends similar to those of the shafts H above described. The lower inturned portions of the shafts form axles for disks T. The upper ends of the shafts have rigid arms U, which overlap, and a draw-bar W extends from these arms to hand-lever X in substantially the same manner described for the operating connection to the front disks, so that by moving the lever X the working angle of the rear disks T may be regulated. Thus as to the rear disks T the machine permits a vertical adjustment by one mechanism, a lateral adjustment by another mechanism, and an angular adjustment by mechanism under control of the driver.

This simple machine provides for all the needs of the cultivation of listed corn and can be so readily adapted to the different conditions of the crop that it is found preferable to more elaborate and complex machines. The blades cut the weeds and stir the soil. The disks following the blades turn over the soil more or less, according to their position, which may be controlled as stated.

What I claim is—

1. A lister-cultivator of the character described, consisting essentially of a pair of runners suitably connected, blades extending outwardly from said runners, a pair of angularly-adjustable disks at the rear of the runners, and a second pair of disks, both vertically and angularly adjustable in the rear of the first disks, and means extending to the vicinity of the driver's seat, whereby the angular position of the disks may be controlled, all substantially as described.

2. In a cultivator of the character described, a supporting-frame, rigid arms as G extending to the rear thereof, vertical shafts having bearings in said arms and having inturned ends forming axles, rotating disks on said axles, and rigid slotted arms extending from each other and overlapping, and a draw-rod connected to said slotted arms and to a hand-lever, all combined substantially as described.

3. In a lister-cultivator, a pair of runners, a pair of rigid arms extending to the rear thereof and having angularly-adjustable disks connected thereto, and a pair of vertically-adjustable rigid arms carrying angularly-adjustable disks in rear of the first pair, all combined substantially as described.

4. In a cultivator of the character described, the runners, arms extending to the rear thereof and vertically and laterally adjustable at their rear ends, a rotating disk carried by each of these arms, and means extending to the vicinity of the driver's seat whereby these disks may be adjusted angularly, all combined substantially as described.

In testimony whereof I affix my signature in presence of two witnesses.

JAMES M. CLARK.

Witnesses:
JOHN F. BOWEN,
JOHN C. BROOKS.